United States Patent
Ghannam et al.

(10) Patent No.: US 10,046,724 B2
(45) Date of Patent: Aug. 14, 2018

(54) METHOD AND APPARATUS FOR ATTACHING POLICE PUSH BARS

(71) Applicant: FORD GLOBAL TECHNOLOGIES, LLC, Dearborn, MI (US)

(72) Inventors: Mahmoud Yousef Ghannam, Canton, MI (US); Swadad A. Carremm, Canton, MI (US); John W. Jensen, Canton, MI (US); David James Bauch, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/407,500

(22) Filed: Jan. 17, 2017

(65) Prior Publication Data

US 2018/0201210 A1    Jul. 19, 2018

(51) Int. Cl.
*B60R 19/52* (2006.01)
*B60R 19/26* (2006.01)
*B60R 19/54* (2006.01)

(52) U.S. Cl.
CPC .............. *B60R 19/52* (2013.01); *B60R 19/26* (2013.01); *B60R 19/54* (2013.01); *B60R 2019/522* (2013.01)

(58) Field of Classification Search
CPC ......... B60R 19/52; B60R 19/26; B60R 19/54; B60R 2019/522
USPC .......................... 293/117, 133, 102, 115, 155
See application file for complete search history.

(56) References Cited

U.S. PATENT DOCUMENTS

| | | | |
|---|---|---|---|
| 3,528,684 A * | 9/1970 | Cowgill | B60D 1/02 280/456.1 |
| 4,825,975 A * | 5/1989 | Symes | B60R 3/007 182/150 |
| 5,277,465 A * | 1/1994 | Weir | B60R 19/52 280/762 |
| 6,231,093 B1 * | 5/2001 | Storer | B60R 19/52 293/115 |
| 6,318,773 B2 * | 11/2001 | Storer | B60R 19/52 293/115 |
| 7,090,267 B2 * | 8/2006 | Pendarvis | B60R 19/24 293/133 |
| 7,246,832 B2 * | 7/2007 | Cobble | B60R 19/52 293/115 |
| 8,585,107 B2 * | 11/2013 | Kekich, Jr. | B60R 19/52 293/115 |
| 8,764,080 B2 | 7/2014 | Hardy et al. | |
| 9,840,218 B1 * | 12/2017 | Wymore | B60R 19/50 |
| 2012/0068483 A1 * | 3/2012 | Fisher | B60R 19/54 293/142 |

(Continued)

*Primary Examiner* — Jason S Morrow
*Assistant Examiner* — E Turner Hicks
(74) *Attorney, Agent, or Firm* — Jason C. Rogers; Brooks Kushman P.C.

(57) ABSTRACT

A push-bar assembly including a push-bar and a pair of push-bar supports. The push-bar supports are attached by a pair of upper brackets and a pair of lower brackets. The lower brackets include about which a mounting block attached to the push-bar supports pivot when the push-bar assembly is assembled to a vehicle. A clevis bracket and clevis pin are provided on lower bracket assemblies that secure a lower mounting block on the push-bar supports to a pair of lower bracket assemblies.

17 Claims, 5 Drawing Sheets

(56) References Cited

U.S. PATENT DOCUMENTS

2013/0134724 A1* 5/2013 Fisher .................... B60R 19/54
293/142
2014/0339837 A1* 11/2014 Hermann, III ........... B66D 1/00
293/115

* cited by examiner

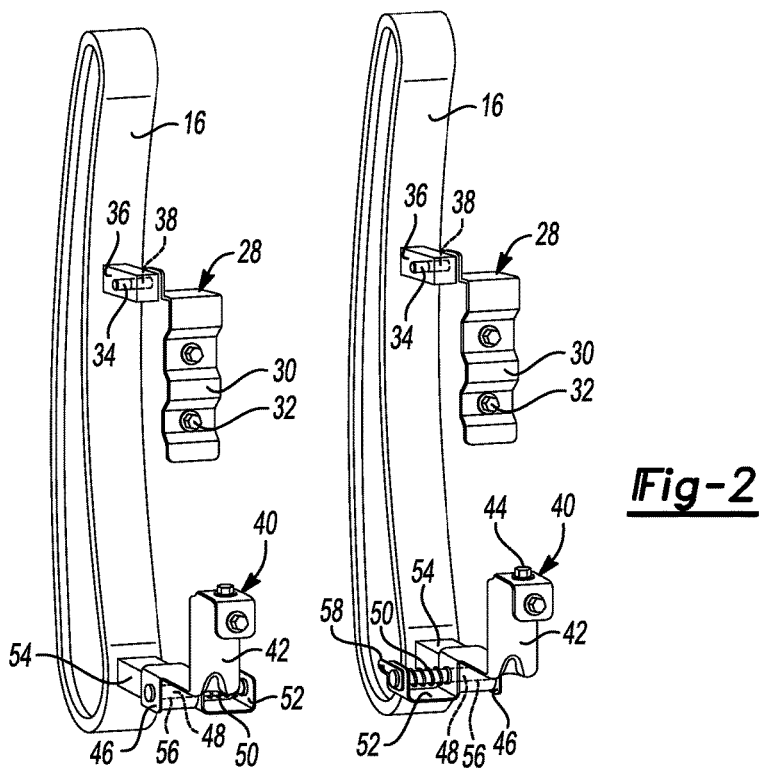
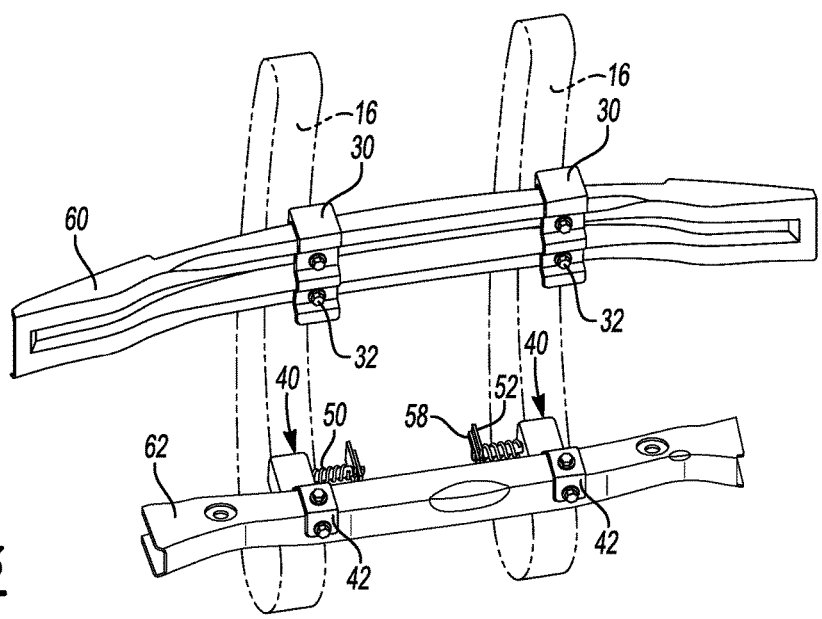

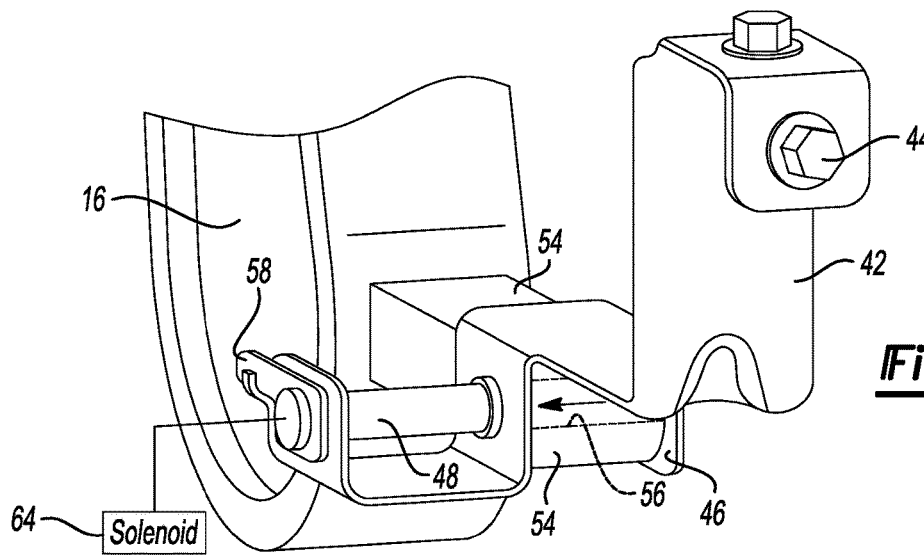
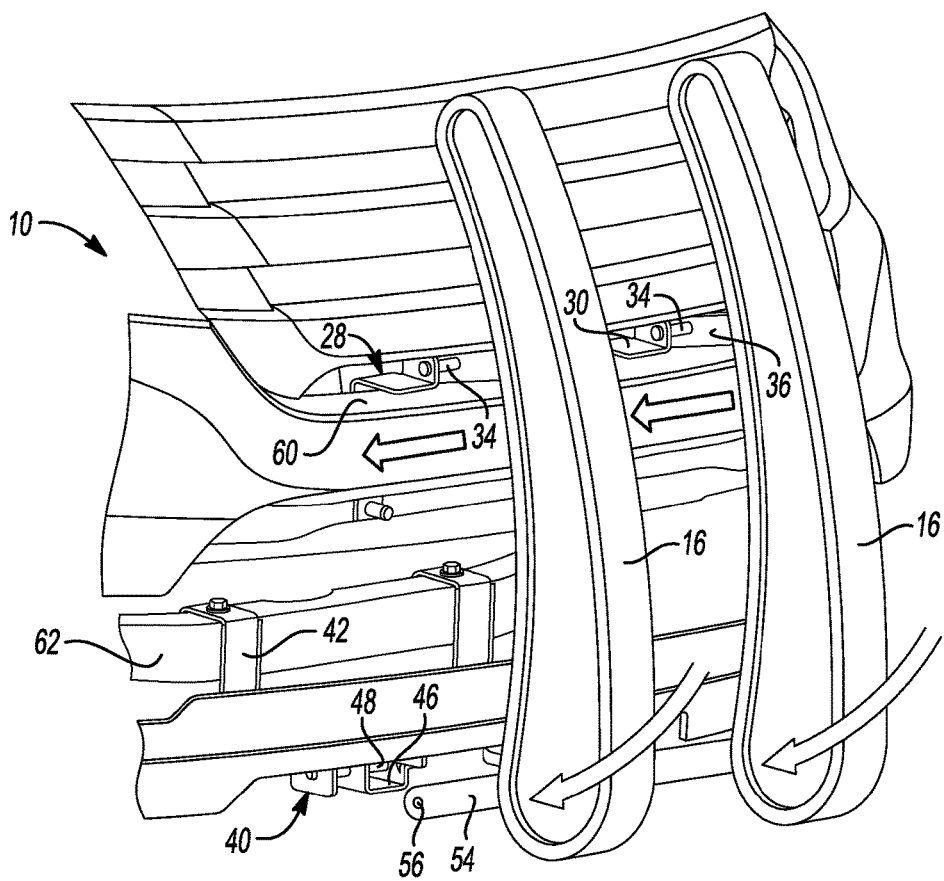

US 10,046,724 B2

METHOD AND APPARATUS FOR ATTACHING POLICE PUSH BARS

TECHNICAL FIELD

This disclosure relates to an attachment mechanism that accommodates vehicle push bars having different designs, made of different materials, or having different options.

BACKGROUND

Police interceptor vehicles and other emergency or special purpose vehicles are provided with push bars on the front end. Aftermarket push bars may have different designs and may be fabricated as a flat plate, a contoured plate, a tubular frame, etc. Push bars may be made of different materials such as steel, aluminum, polycarbonate, polyethylene, or the like. Grill guards, brush guards and other features and options may be incorporated in a push bar. Push bars come in different sizes and must be able to be attached to different types of vehicles.

This disclosure is directed to solving the above problems and other problems as summarized below.

SUMMARY

According to one aspect of this disclosure, a push-bar assembly is disclosed that comprises a push-bar and a pair of push-bar supports defining upper and lower openings. A pair of upper brackets are attached to a vehicle rail that each includes a rod receivable in an upper opening and about which the push-bar may be pivoted. A pair of lower brackets is attached to a bumper below the vehicle rail that each include a clevis bracket and a pin receivable in a lower opening to secure the push-bar to the clevis bracket.

According to other aspects of this disclosure, the push-bar assembly may further comprise a pair of springs with each spring being attached between one of the pins and one of the lower brackets to bias the pin to a locked position. The pin may be shifted to an unlocked position by sliding the pin against a biasing force applied by the spring to remove the pin from the lower opening to facilitate securing and releasing the push-bar support to and from the clevis bracket.

The push-bar assembly may further comprise a precision immobilization technique bar (hereinafter a "PIT bar"), a brush guard, a grill guard, or the like attached to the push-bar supports.

The push-bar assembly may further comprise a pair of solenoids each operatively connected to one of the pins and one of the lower brackets for shifting the pin between a locked position and an unlocked position.

According to another aspect of this disclosure, a push-bar assembly is disclosed that comprises a push-bar and a push-bar support frame defining an upper opening and a latch receiver. Upper brackets are attached to a vehicle rail including a rod receivable in the upper opening to pivot the push bar assembly about the rod. Lower brackets are attached to a frame rail below a bumper that include a latch received by the latch receiver to secure the push-bar to the lower bracket.

The push-bar assembly may further comprise a spring operatively connected to the latch that biases the latch to a locked position. The latch may be shifted to an unlocked position by sliding the latch against a biasing force applied by the spring to remove the latch from the latch receiver to facilitate securing the push-bar support to and releasing the push-bar support from the lower bracket.

Alternatively, the push-bar assembly may further comprise a solenoid operatively connected to the latch and the lower bracket for shifting the latch between a locked position and an unlocked position.

According to another aspect of this disclosure, a method is disclosed for attaching a push-bar to a vehicle. The method comprises the steps of assembling an upper bracket having a pivot pin to an upper rail above a grill opening and assembling a lower bracket including a clevis to a lower rail below the grill opening. The push-bar assembly is attached to the pivot pin and is pivoted on the pivot pin. The push-bar assembly is then assembled and latched to the lower bracket.

According to other aspects of the method, the lower bracket may include a clevis bracket including a pin and a spring and the step of latching the push-bar assembly may further comprise moving the pin in a first direction against a biasing force provided by the spring to an open position. The pin is biased by the spring in a second direction opposite the first direction to a closed position.

Alternatively, the method may comprise latching the push-bar assembly by actuating a solenoid to move a pin in a first direction to an open position. The solenoid may be actuated to move the pin in a second direction opposite the first direction to a closed position.

The push-bar assembly may include a support frame attached to a push-bar that defines an upper opening for receiving the pivot pin and a latch receptacle that cooperates with a latch for latching the push-bar to the lower bracket.

The above aspects of this disclosure and other aspects will be described below with reference to the attached drawings.

BRIEF DESCRIPTION OF THE DRAWINGS

FIG. 2 is a rear perspective view of a pair of push-bar supports.

FIG. 3 is a rear perspective view of the brackets of a pair of push-bar supports connected to a vehicle rail and a bumper disposed below the vehicle rail.

FIG. 9 is a fragmentary rear perspective view of an alternative embodiment of a lower bracket secured to a push-bar support that includes a solenoid actuator.

FIG. 10 is a fragmentary perspective view illustrating the two-step process for assembling a pair of the push-bar supports to a vehicle.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
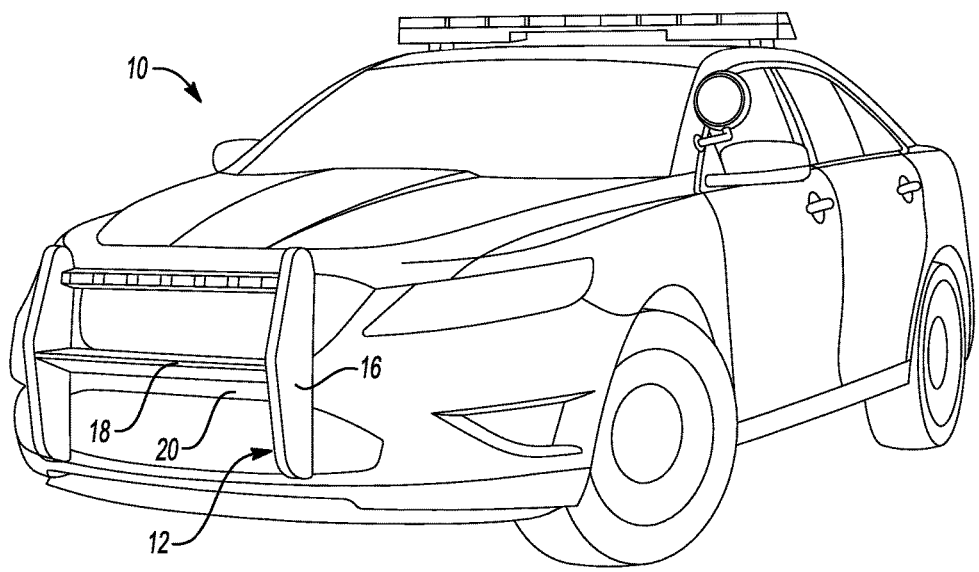
FIG. 1 is a front left perspective view of a police interceptor vehicle provided with a push-bar in front of the front bumper.

Referring to FIG. 1, an emergency vehicle 10, such as a police interceptor car, is shown with a push-bar assembly generally indicated by reference numeral 12. The push-bar assembly 12 includes a pair of push-bar supports 16 (hereinafter referred to as support) and grill guard bars 18 that extend between the supports 16. The push-bar assembly 12 is attached to the vehicle 10 in front of a front bumper 20.

Figure 1A:
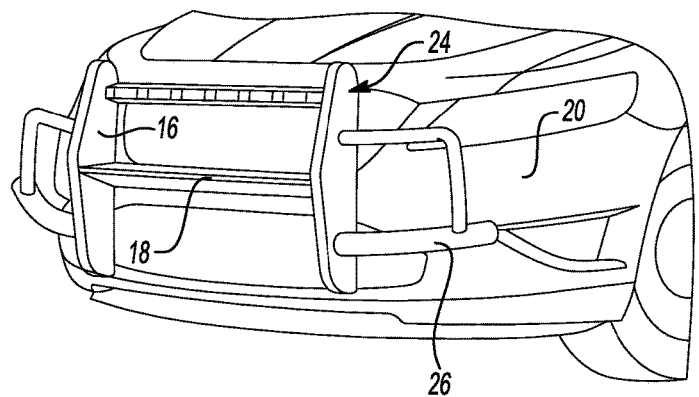
FIG. 1A is a fragmentary front left perspective view of a vehicle with a push-bar including a set of precision immobilization technique bars (PIT bars) attached to the push-bar support.

Referring to FIG. 1A, an alternative embodiment of a push-bar assembly 24 is shown that includes a pair of precision immobilization technique bars (PIT bars) 26. It should be understood that other attachments to the push-bar assembly 12 may be provided such as a brush-guard, or the like, depending upon the environment and intended use of the push-bar assembly 12.

Referring to FIG. 2, a pair of push-bar supports 16 are shown that are detached from a vehicle. The push-bar supports 16 are attached on their upper ends by upper bracket assemblies 28 that each include a bracket portion 30 that is secured to the vehicle by fasteners 32. Depending upon the make and model of vehicle that the push-bar assemblies are to be attached to, interchangeable styles of bracket assemblies may be provided as a kit. Alternatively, the bracket assemblies 28 may be provided as a standard strip that may be custom formed for a particular installation. A pin 34 is attached to the bracket portion 30 that is adapted to be received by a mounting block 36 in an opening 38 defined by the mounting block 36.

A lower end of the push-bar supports 16 are provided with lower bracket assemblies 40. Lower bracket assemblies 40 each include a bracket portion 42 that is adapted to be attached to the vehicle 10 by fasteners 44. Interchangeable styles of bracket assemblies may be provided as a kit or the bracket assemblies 40 may be provided as a standard strip that may be custom formed for a particular installation, as described above with respect to the upper bracket assemblies 28. The lower bracket assemblies 40 each include a clevis bracket 46 and clevis pin 48. The clevis pins 48 are biased to a position by a spring 50 with the clevis pin 48 being received in the clevis bracket 46. The spring 50 is also retained in a pin/spring retainer 52. The pin/spring retainer 52 guides the movement of the clevis pin 48 into the clevis bracket 46 and also guides the clevis pin 48 when it is released from the clevis bracket 46.

A mounting block 54 is provided on the lower end of the push-bar support. The mounting block 54 defines an opening 56 that is adapted to receive the clevis pin 48 when the mounting block 54 is disposed in the clevis bracket 46. The clevis pin 48, when received in the opening 56, holds the lower end of the push-bar support 16 in the clevis bracket 46. A latch locking tab 58 is provided on an outer end of the clevis pin 48 to lock the clevis pin 48 in the clevis bracket 46.

Referring to FIG. 3, a pair of push-bar support 16 are shown in phantom in position to be assembled onto an upper vehicle rail 60 and a bumper beam 62. Bracket portions 30 are shown attached by fasteners 32 to the upper vehicle rail 60. A pair of lower bracket assemblies 40 are shown attached to the bumper beam 62 by the clevis brackets 46 with the springs 50 shown disposed in the pin/spring retainer 52.

Figure 4:
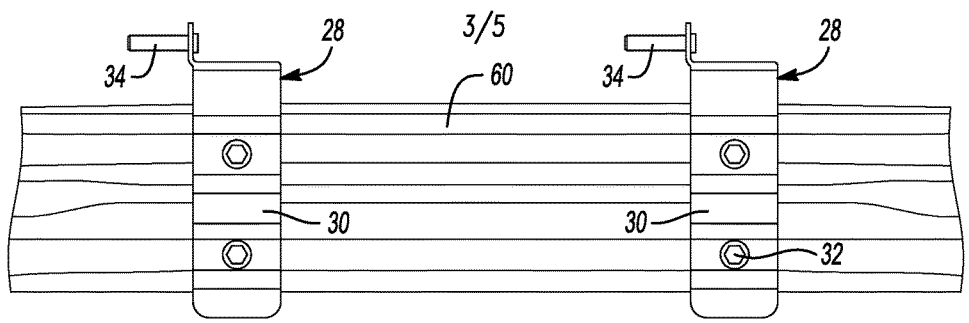
FIG. 4 is a top plan view of a pair of upper brackets attached to the vehicle rail.

Referring to FIG. 4, the upper bracket assemblies 28 are shown attached to the upper vehicle rail 60 with the bracket portions 42 of the pair of upper bracket assemblies 28 secured by fasteners 32 to the upper rail 60. The pin 34 is shown extending from the left side of both of the upper bracket assemblies 28.

Figure 5:
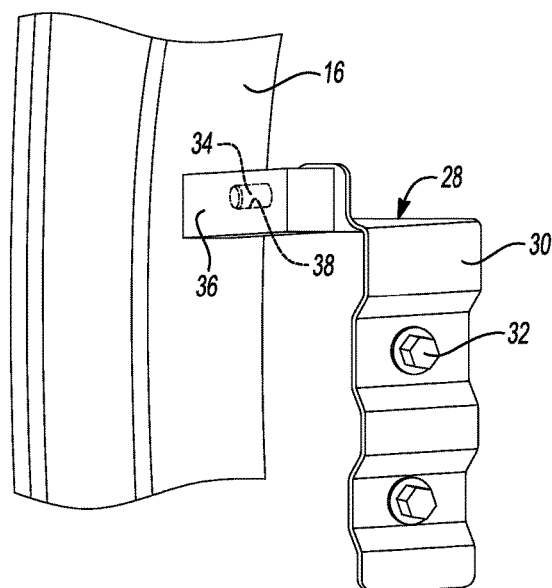
FIG. 5 is a fragmentary perspective view of a push-bar support connected to one of the upper brackets.

Referring to FIG. 5, an upper bracket assembly 28 is shown attached to a push-bar support 16 with the pin 34 being received in the opening 38 defined by the mounting block 36. The mounting block 36 is attached to the rear surface of the push-bar support 16.

Figure 6:
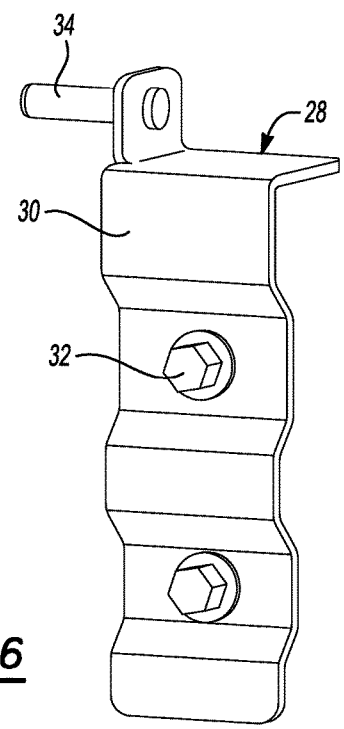
FIG. 6 is a perspective view of one of the upper brackets.

Referring to FIG. 6, an upper bracket assembly 28 is shown to include the bracket portion 30 and fasteners 32 that are used to attach the upper bracket assembly to the upper rail as shown in FIG. 4 above. The pin 34 is shown extending from one side of the upper bracket assembly 28.

Figure 7:
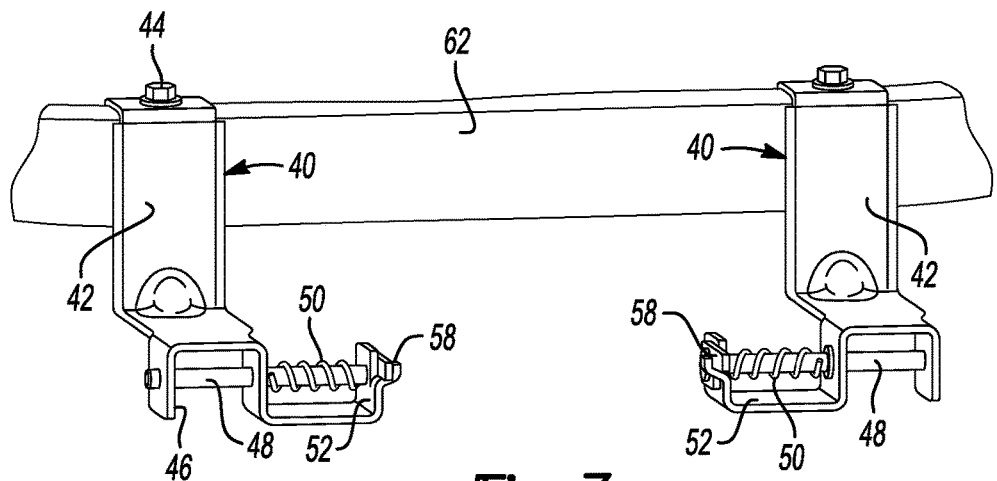
FIG. 7 is a front perspective view of a pair of lower brackets including a spring biased clevis pin latch.

Referring to FIG. 7, a pair of lower bracket assemblies 40 are shown attached to a bumper beam 62. The lower bracket assemblies 40 include the lower bracket portions 42 that are attached to the bumper beam 62 by the fasteners 44. The clevis bracket 46 is integrally formed with the bracket portion 42. The clevis pin 48 is shown in its locking position disposed across the clevis bracket 46. The clevis pin 48 is biased by the spring 50 into the locking position as shown in FIG. 7. The spring 50 is retained by the pin/spring retainer 52 and is held in place by the latch locking tab 58.

Figure 8:
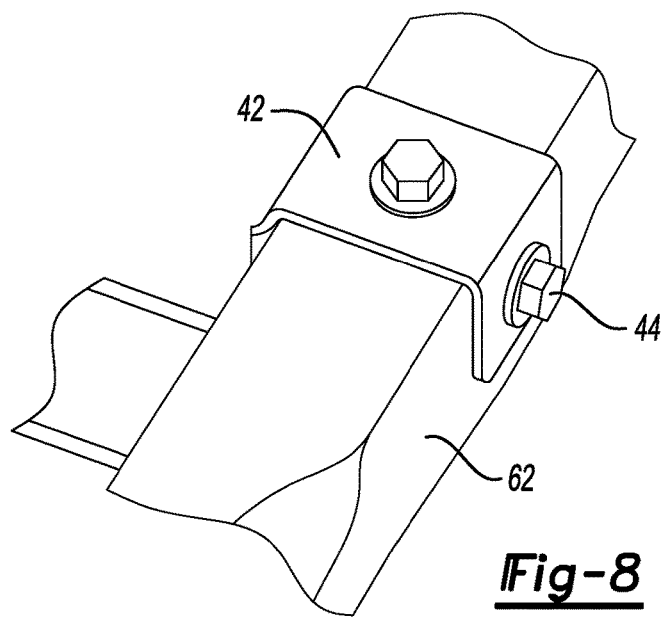
FIG. 8 is a fragmentary perspective view of one of the lower brackets connecting a portion of the lower bracket to a bumper rail.

Referring to FIG. 8, the bracket portion 42 is shown being secured to the bumper beam 62 by fasteners 44.

Referring to FIG. 9, an alternative embodiment of the lower bracket assembly 40 is illustrated wherein a solenoid 64 is operatively attached to the clevis pin 48. The solenoid 64 extends and retracts the clevis pin 48 from the clevis bracket 46. The mounting block 54 is shown being retained in the clevis bracket 46 by the clevis pin 48. The mounting block 54 is attached to the push-bar support 16.

Referring to FIG. 10, the process for attaching the push-bars 16 to the front of a vehicle 10 is illustrated. The push-bars 16 may be assembled individually or if connected by grill guard bars 18 may be assembled at the same time to the pins 34 of the upper bracket assemblies 28. The upper bracket assemblies 28 are shown attached to an upper vehicle rail 60. The mounting blocks 36 are moved in the direction of the straight arrows in FIG. 10 to secure the push-bar support 16 to the upper bracket assemblies 28. After the mounting blocks 36 are assembled to the pins 34, the push-bar supports 16 are pivoted downwardly about the pins 34 as shown by the arcuate arrows at the lower portion of FIG. 10 to insert the mounting blocks 54 into the lower bracket assemblies 40. The mounting blocks 54 are inserted to the clevis brackets 46 and secured by the clevis pins 48.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:
1. A push-bar assembly comprising:
   a push-bar;
   a pair of push-bar supports defining upper and lower openings;
   a pair of upper brackets attached to a vehicle rail, each including a rod receivable in one upper opening about which the push-bar supports pivot;

a pair of lower brackets attached to a bumper below the vehicle rail, each including a clevis bracket and a pin receivable in one lower opening to secure the push-bar supports; and a pair of springs with each spring being attached between one of the pins and one of the lower brackets to bias the pin to a locked position.

2. The push-bar assembly of claim 1 wherein the pin is shifted to an unlocked position by sliding the pin against a biasing force applied by the spring to remove the pin from the lower opening to facilitate securing and releasing the push-bar support to and from the clevis bracket, respectively.

3. The push-bar assembly of claim 1 further comprising:
a precision immobilization technique bar attached to the push-bar supports.

4. The push-bar assembly of claim 1 further comprising:
a brush guard attached to the push-bar supports.

5. The push-bar assembly of claim 1 further comprising:
a grill guard attached to the push-bar supports.

6. A push-bar assembly comprising:
a push-bar;
a pair of push-bar supports defining upper and lower openings;
a pair of upper brackets attached to a vehicle rail, each including a rod receivable in one upper opening about which the push-bar supports pivot;
a pair of lower brackets attached to a bumper below the vehicle rail, each including a clevis bracket and a pin receivable in one lower opening to secure the push-bar supports; and
a pair of solenoids operatively connected to one of the pins and one of the lower brackets to shift the pin between a locked position and an unlocked position.

7. A push-bar assembly comprising:
a push-bar;
a frame defining upper opening and a latch receiver;
upper brackets attached to a vehicle rail including a rod receivable in the upper opening to pivot about the rod;
lower brackets attached to a frame rail below a bumper, wherein the lower brackets include a latch received by the latch receiver to secure the push-bar to the lower bracket; and
a spring biasing the latch to a locked position.

8. The push-bar assembly of claim 7 wherein the latch is shifted to an unlocked position by sliding the latch against a biasing force applied by the spring to remove the latch from the latch receiver to facilitate securing the frame to and releasing the push-bar support from the lower bracket.

9. The push-bar assembly of claim 7 further comprising:
a precision immobilization technique bar attached to the push-bar.

10. The push-bar assembly of claim 7 further comprising:
a brush guard attached to the push-bar.

11. The push-bar assembly of claim 7 further comprising:
a grill guard attached to the push-bar.

12. A push-bar assembly comprising:
a push-bar;
a frame defining upper opening and a latch receiver;
upper brackets attached to a vehicle rail including a rod receivable in the upper opening to pivot about the rod;
lower brackets attached to a frame rail below a bumper, wherein the lower brackets include a latch received by the latch receiver to secure the push-bar to the lower bracket and
a solenoid operatively connected to the latch and the lower bracket for shifting the latch between a locked position and an unlocked position.

13. A method of attaching a push-bar to a vehicle comprising:
assembling an upper bracket having a pivot pin to an upper rail above a grill opening;
assembling a lower bracket including a clevis to a lower rail below the grill opening, wherein the lower bracket includes a clevis bracket including a pin and a spring;
attaching a push-bar assembly to the pivot pin;
pivoting the push-bar assembly on the pivot pin;
assembling the push-bar assembly to the lower bracket; and
latching the push-bar assembly to the lower bracket by moving the pin in a first direction against a biasing force provided by the spring to an open position.

14. The method of claim 13 further comprising:
biasing the pin with the spring in a second direction opposite the first direction to a closed position.

15. The method of claim 13 wherein the step of latching the push-bar assembly further comprises:
actuating a solenoid to move a pin in a first direction to an open position.

16. The method of claim 15 further comprising:
actuating the solenoid to move the pin in a second direction opposite the first direction to a closed position.

17. The method of claim 13 wherein the push-bar assembly includes a support frame attached to a push-bar, the support frame defining an upper opening for receiving the pivot pin and defining a latch receptacle that cooperates with a latch for latching the push-bar to the lower bracket.

* * * * *